US006988514B2

(12) United States Patent
Weber

(10) Patent No.: US 6,988,514 B2
(45) Date of Patent: Jan. 24, 2006

(54) HYDROACCUMULATOR, IN A PARTICULAR A BLADDER ACCUMULATOR

(75) Inventor: Norbert Weber, Sulzbach (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 10 days.

(21) Appl. No.: 10/399,445

(22) PCT Filed: Oct. 12, 2001

(86) PCT No.: PCT/EP01/11838

§ 371 (c)(1), (2), (4) Date: Apr. 17, 2003

(87) PCT Pub. No.: WO02/33266

PCT Pub. Date: Apr. 25, 2002

(65) Prior Publication Data

US 2004/0020543 A1 Feb. 5, 2004

(30) Foreign Application Priority Data

Oct. 18, 2000 (DE) ........................................ 100 51 580

(51) Int. Cl.
*F16L 55/04* (2006.01)

(52) U.S. Cl. .......................... 138/30; 138/31; 220/721; 220/530; 137/504

(58) Field of Classification Search .................. 138/30, 138/31, 26; 220/721, 530, 4.12, 581; 137/504, 137/505

See application file for complete search history.

(56) References Cited

U.S. PATENT DOCUMENTS 2,331,921 A * 10/1943 Mercier ....................... 138/30
2,345,124 A * 3/1944 Huber ......................... 138/30
RE23,333 E * 1/1951 Mercier ....................... 138/30
RE23,437 E 12/1951 Mercier ....................... 138/30
2,731,038 A * 1/1956 Purcell ........................ 138/30
3,038,501 A * 6/1962 Greer .......................... 138/30
4,068,684 A 1/1978 Greer .......................... 138/30
4,112,978 A * 9/1978 Olbrich et al. ................ 138/30
4,136,714 A * 1/1979 Jones .......................... 138/30
4,509,557 A 4/1985 Sugimura .................... 138/30
5,368,073 A * 11/1994 Murphy ....................... 138/30
6,460,571 B1 * 10/2002 Rajabi et al. ................. 138/31
6,478,051 B1 * 11/2002 Drumm et al. ............... 138/30

FOREIGN PATENT DOCUMENTS

DE 2452882 5/1976
FR 79885 2/1963
WO 0031420 6/2000

* cited by examiner

*Primary Examiner*—Patrick Brinson
(74) *Attorney, Agent, or Firm*—Roylance, Abrams, Berdo & Goodman L.L.P.

(57) ABSTRACT

A hydroaccumulator, in particular a bladder accumulator, includes a pressurized container (1) and a separation element (5) located in the container to separate a gas chamber (7) lying adjacent to an inlet on the gas side from a fluid chamber (9) lying adjacent to an inlet on the fluid side inlet (3), having a fluid connecting sleeve (11) and a valve arrangement located in the connecting sleeve (11). The valve body (17) has a transversal bore (33). The valve body is pretensioned in an open position which allows the passage of fluid and can be displaced into a closed position by a displacement of the separation element (5). The interior surface (15) of the connecting sleeve (11) lies directly against the valve body (17) and guides the displacement of the body between the open and closed positions. The side of the valve body (17') that faces the separation element (5) is configured as a planar plate extending partially into the fluid chamber (9). The diameter of the valve body (17) is greater than its height, measured in the direction of displacement of the valve body (17). The valve arrangement has a plate-valve construction of small proportions and can be cost-effectively produced.

12 Claims, 2 Drawing Sheets

HYDROACCUMULATOR, IN A PARTICULAR A BLADDER ACCUMULATOR

FIELD OF THE INVENTION

The present invention relates to a hydroaccumulator, in particular a bladder accumulator, with a pressure tank and a separating element located in and separating a gas space from a fluid space in the pressure tank. The gas space borders a gas-side access. The fluid space borders a fluid-side access having a fluid connecting sleeve and a valve arrangement located in the connecting sleeve. The valve includes a valve body having at least one transverse hole and is normally pretensioned into its open position to clear the fluid passage, and can be moved into its closed position by the displacement of the separating element. The inside surface of the connecting sleeve for the valve body directly adjoining the valve body forms the guide for its displacement between the open position and the closed position.

BACKGROUND OF THE INVENTION

Hydraulic accumulators with valves operated by the separating element are commercially available. In the technical reference published by Mannesmann Rexroth GmbH "Hydraulic Guide Volume 1", on page 165, a bladder accumulator of this type is depicted and described. In the known bladder accumulator, the valve arrangement comprises a seat valve. A conical surface is formed on the end edge of a connecting sleeve facing the fluid space to provide a stationary valve seat. The conical surface interacts with a corresponding conical surface on the valve plate of the movable valve body. The valve is made similarly to the control valves conventionally used in valve-controlled internal combustion engines, i.e., the valve plate is located on a shaft guided in a valve guide for the valve lifting motion between the open position and closed position. The valve guide is installed in the connecting sleeve.

The disadvantage is the resulting high production costs due to the required cost for producing and machining of a host of individual parts as a result of this known valve design. To ensure proper operation of the valve arrangement, the valve guide installed in the connecting sleeve must be made carefully with respect to production tolerances for both alignment and fit. Moreover the corresponding machining of the conical surfaces which form the valve seat is necessary.

PCT/WO 00/31420 discloses a generic hydraulic accumulator with a separating element formed from metal bellows. Within the bellows is a compression spring which keeps the separating element in the pretensioned state. On its bottom, the bellows is provided with an end plate which interacts with a valve body accommodated in the fluid connecting sleeve of the housing of the known hydraulic accumulator and held under spring pretension. The valve body is made as a valve lifter and is larger in dimensions in its lengthwise alignment than in the transverse direction. Thus, the known valve body occupies considerable space in its direction of displacement in the connecting sleeve. The end of the valve body interacting with the end plate is made dome-like. In conjunction with the different diameters, grooves and recesses, beveled surfaces and the transverse hole on the other end of the valve body, a resulting complex geometry requires a complex and costly machining process in production. The complex geometrical structure of the closing body continues in the area of the fluid guide. As a result of the repeated deflection of the fluid flow, especially in the area of the incident flow of the medium into the fluid space, unfavorable flow behavior is implemented so that the known approach to hydraulic accumulators with sensitive membrane bladders is not suitable. U.S. Pat. No. 4,068,684 discloses a generic hydraulic accumulator. In the known approach, the spring-loaded valve body is a sleeve-shaped plug neck with a height measured in the direction of displacement of the valve body. The height is several times larger than its diameter. The valve body is formed on its side facing the separating element as a plate. The plate is flat. Its sleeve-like outside jacket has transverse holes diametrically opposite one another and connected to the fluid side of the hydraulic accumulator in the open position of the valve to carry fluid. The known valve body approach accordingly has a very large structure in the axial direction of the hydraulic accumulator. Due to the fluid-carrying transverse holes, the flow behavior cannot be choked and is consequently unfavorable in the area of inflow of the medium into the fluid space.

SUMMARY OF THE INVENTION

Objects of the present invention are to provide a hydraulic accumulator where the valve body occupies little space, is geometrically simple in structure, can be economically implemented, and allows optimized flow behavior in the area of the flow into the fluid space.

By virtue of the diameter of the valve body being larger than its height measured in the direction of displacement of the valve and because the respective transverse hole in the valve piston is made as a fluid channel, the valve arrangement is made in the manner of a plate valve occupying little space and can be economically implemented. The respective fluid channel is integrated into the interior of the valve body allowing controlled triggering of the fluid flow. The fluid channels can be chosen in terms of their number and cross-sectional size. As fluid passes, the desired choking takes place, with the possibility of stipulating the damping conditions which are optimum when the hydraulic accumulator is in operation, depending on the intended application.

By integrating the fluid channels into the interior of the valve body, complex machining for differentiated shaping of the outside surface of the valve body, as in the known approaches, is unnecessary. Moreover, by means of the respective fluid channels, a homogeneous outflow behavior of the fluid into the fluid space is ensured. Especially when a bladder accumulator is implemented, flow then takes place carefully around the separating membrane which is sensitive to pressure peaks and which ordinarily is formed of a rubber-elastic material. This arrangement leads to an increased service life for the hydraulic accumulator of the present invention.

Production is especially simple if the valve arrangement is a sliding valve, with the connecting sleeve being used as the valve housing and with its circular cylindrical inside surface defining the piston bore for the valve body which is made as a sliding piston.

In these embodiments, the end edge of the piston bore of the connecting sleeve, which edge borders the fluid space, forms the control edge for clearing and closing one or more fluid channels of the sliding piston.

The piston bore which guides the sliding piston can preferably have, on its end area adjacent to the fluid space, a tapered hole section. An annular shoulder surface is then formed, which in interaction with an opposing shoulder surface which projects radially on the sliding piston, forms a stop against which the sliding piston rests in the open position of the valve.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
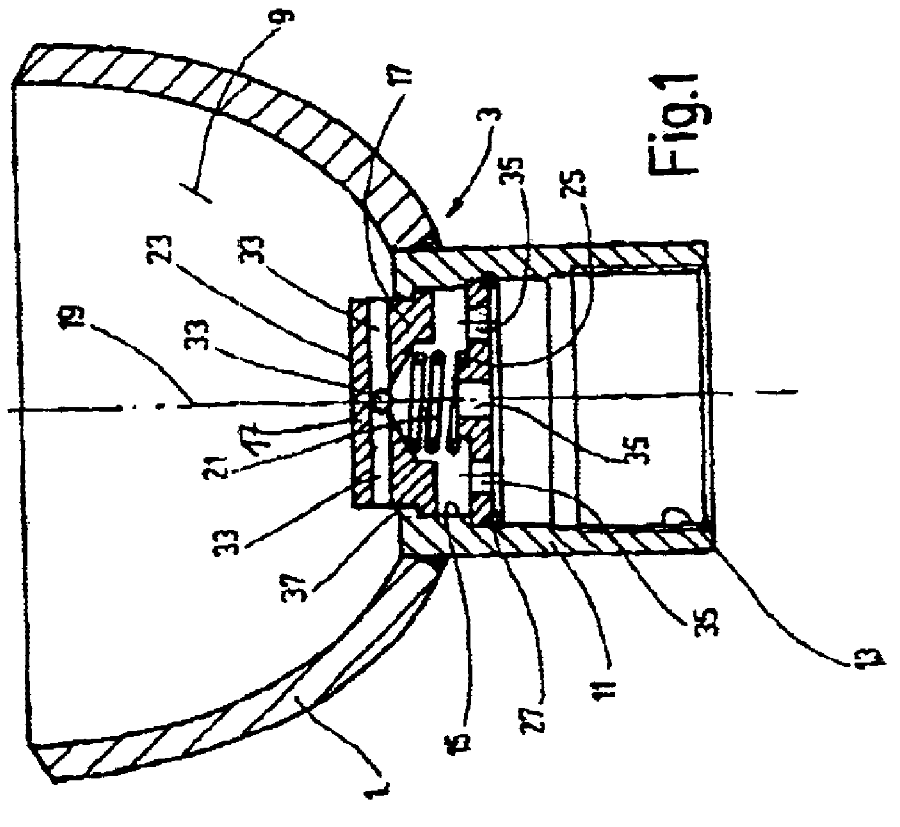
FIG. 1 is a partial, side elevational view in section of a bladder accumulator according to a first embodiment of the present invention, with only the part of the accumulator adjacent to the fluid-side connecting sleeve being illustrated and with the valve arrangement illustrated in the open position.

In FIG. 1, only the section of the pressure tank adjacent to the fluid-side access 3 is shown. The opposite end area (not shown) of the pressure tank 1 has a conventionally configured gas-side access to the interior space of a storage bladder 5 (only schematically illustrated in FIG. 3). Storage bladder 5 forms the movable separating element separating the gas space 7 from the fluid space 9 in the interior of the pressure tank.

In the embodiment shown in FIG. 1, the fluid-side access 3 comprises a fluid connecting sleeve 11 welded onto the end wall of the pressure tank 1 adjacent to the fluid space 9. The connecting sleeve 11 is a circularly cylindrical sleeve and has an inside thread 13 on its outer free end for the connection of a fluid line (not shown). In the end area adjacent to the fluid space 9, the connecting sleeve 11 forms a piston bore 15 in which a sliding piston 17 is movably guided. The connecting sleeve 11 thus forms the valve housing for a sliding valve with the sliding piston 17 used as the movable valve body and guided on the inside surface of the piston bore 15 of the connecting sleeve 11 directly for its displacement along the lengthwise axis 19 of the piston bore 15. Sliding piston 17 can be moved between the open position shown in FIGS. 1 and 3, and the closed position shown in FIG. 2.

Figure 3:
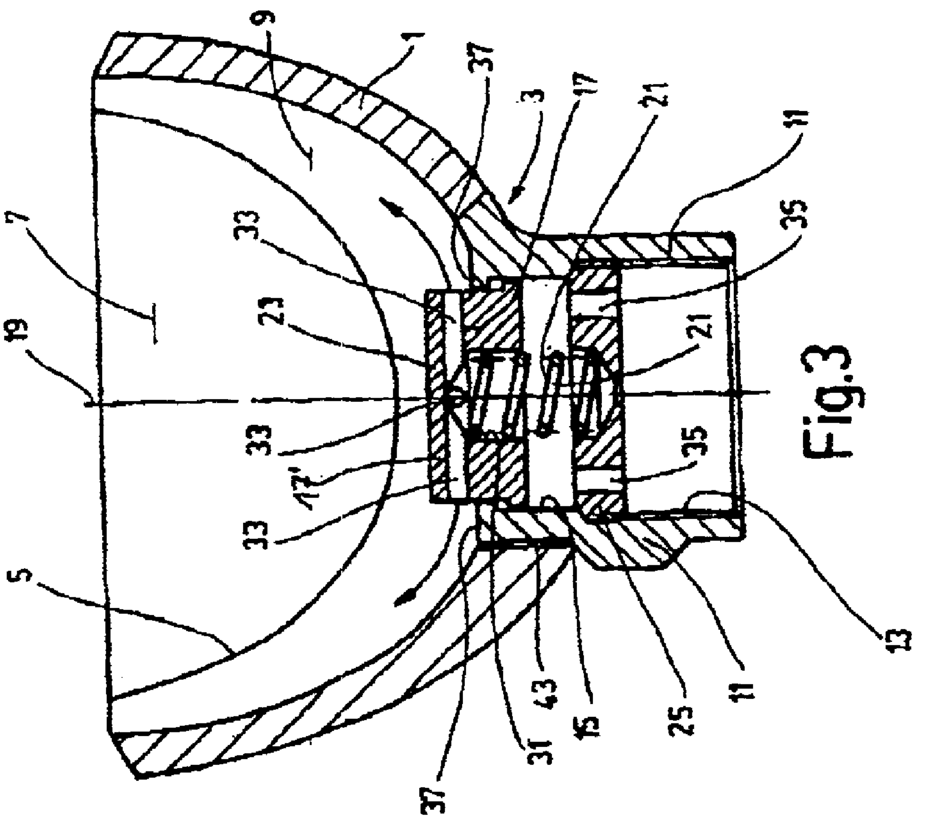
FIG. 3 is a partial, side elevational view in section of a bladder accumulator according to a third embodiment of the present invention on the left side and according to a fourth embodiment of the present invention on the right side, with the valve arrangement being shown in the open position.

The sliding piston 17 is pretensioned by a helical compression spring 21 into the open position shown in FIGS. 1 and 3. From this position, the sliding piston can be moved with the corresponding expansion of the storage bladder 5 against the force of the compression spring 21 into the closed position shown in FIG. 2 when the storage bladder presses against the top 23 of the accumulator sliding piston 17.

The compression spring 21 is supported with its end facing away from the sliding piston 17 on a support plate 25. The support plate adjoins a shoulder located on the adjacent end of the piston bore 15 in the connecting sleeve 11. In the embodiment of FIG. 1, support plate 25 is held by a retaining ring 27. In the second embodiment of FIG. 2, the support plate 25 is secured by a flat snap ring 29. Aside from this difference, the embodiment of FIG. 2 corresponds to that of FIG. 1.

The compression spring 21 is tensioned between the support plate 25 and the sliding piston 17, and extends into an axial hole 31 in the sliding piston 17 from its end facing away from the fluid space 9. Axial hole 31 is concentric to the lengthwise axis 19, and discharges into transverse holes 33 in the sliding piston 17. These transverse holes extend radially in the vicinity of the top 23 of the sliding piston 17, and at a right angle to one another so that they intersect on the lengthwise axis 19. These transverse holes 33 in the sliding piston 17 form fluid channels which interact with the valve control edge and which form the fluid access to the fluid space 9, by way of the axial hole 31 of the sliding piston 17 and the through holes 35 in the support plate 25 when the sliding piston is in the open position shown in FIGS. 1 and 3.

Figure 2:
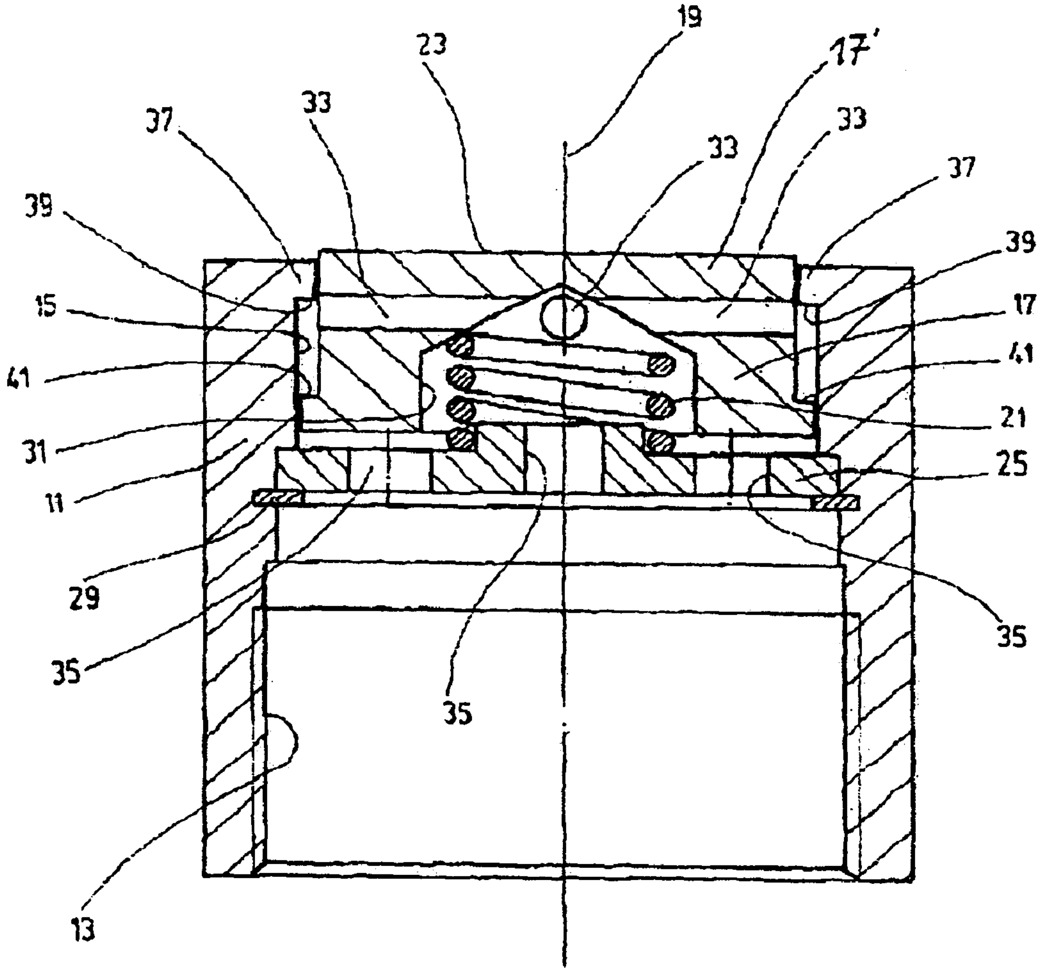
FIG. 2 is a side elevational view in section of only the fluid connecting sleeve of a bladder accumulator according to a second embodiment of the present invention, on a much larger scale compared to FIG. 1, with the valve arrangement illustrated in the closed position.

In the position of the sliding piston 17 shown in FIG. 2, the orifices of the transverse hole 33 are closed by the control edge of the connecting sleeve 11 used as the valve housing. The control edge is formed on the sleeve upper end edge 37, see FIG. 2. As shown in FIG. 2, the piston bore 15 in its end section forms a tapered bore section with an annular shoulder surface 39. Shoulder surface 39 interacts with an opposing shoulder surface 41 on the sliding piston 17 (see FIG. 2) forming a stop limiting the displacement of the sliding piston 17 in the direction to the fluid space 9. FIG. 1 shows the corresponding position of the sliding piston 17 fixed by this stop.

In the two embodiments shown in FIG. 3, the support plate 25, formed as an abutment for the compression spring 21, is provided with an outside thread and is screwed into an inside thread 13 formed in the connecting sleeve 11.

In the embodiment shown on the left side in FIG. 3, the connecting sleeve 11 in the section adjacent to the end edge 37 has an outside thread 43 which is screwed to the corresponding inside thread of the wall of the pressure tank 1. The wall thickness of the pressure tank 1 is made greater in the threaded area for this purpose.

The embodiment shown on the right side in FIG. 3 has a connecting sleeve 11 which is molded on the pressure tank 1 in one piece by hot or cold forming. Otherwise, the right side embodiment does not differ from the embodiment shown on the left side in the same figure.

The invention is described above using embodiments in the form of bladder accumulators. The invention can be equally used advantageously in hydraulic accumulators of a different design, for example in membrane accumulators or piston accumulators.

While various embodiments have been chosen to illustrate the invention, it will be understood by those skilled in the art that various changes and modifications can be made therein without departing from the scope of the invention as defined in the appended claims.

What is claimed is:

1. A hydroaccumulator, comprising:

a pressure tank;

a separating element located in said pressure tank and separating a gas space bordering a gas-side access from a fluid space bordering a fluid side access in said pressure tank;

a fluid connecting sleeve at said fluid side access, said sleeve having an inside surface defining a piston bore with a circular cylindrical surface;

a valve body in the form of a flat plate with a closed top surface facing and engagable by said separating element, said valve body being a sliding piston and being slidably received and guided for movement within said inside surface along a longitudinal axis between open and closed positions, said valve body having an elongated first fluid channel extending therethrough and opening on diametrically opposite lateral surface portions of said valve body and having an axial bore opening into said fluid channel at one end thereof and on an axial side of said valve body remote from said fluid space at an opposite end thereof, said valve body having a transverse diameter in a direction perpendicular to said longitudinal axis larger than a height of said valve body measured along said longitudinal axis, said fluid channel opening into said fluid space in said open position and being closed by said connecting sleeve in said closed position;

a spring in said connecting sleeve biasing said valve body toward said open position;

tapered bore section forming an annular shoulder on an end area of said piston bore adjacent said fluid space; and a radially projecting shoulder surface on said sliding piston opposing said annular shoulder on said connecting sleeve and engaging said annular shoulder on said connecting sleeve in said open position under biasing of said spring to form a stop;

whereby, said valve body can be moved by said separating element against biasing of said spring from said open position to said closed position.

2. A hydroaccumulator according to claim 1 wherein said separating element is a bladder.

3. A hydroaccumulator according to claim 1 wherein said fluid channel has an axial length laterally bounded by internal surfaces of said valve body greater than a transverse diameter of said fluid channel.

4. A hydroaccumulator according to claim 1 wherein said connecting sleeve comprises a control edge on an end thereof bordering said fluid space and closing said fluid channel in said closed position.

5. A hydroaccumulator according to claim 4 wherein a support plate is anchored in said piston bore on a side of said sliding piston facing away from said fluid space, said support plate having at least on through hole, said sliding piston and said support plate engaging opposite ends of said spring.

6. A hydroaccumulator according to claim 1 wherein numbers and size of said fluid channel and said axial bore in said sliding piston choke fluid flowing therethrough.

7. A hydroaccumulator according to claim 5 wherein said spring is a helical compression spring; and said axial bore is located centrally in said sliding piston and receives said spring, said spring engaging an abutment of said sliding piston located at a juncture of said fluid channel and said axial bore.

8. A hydroaccumulator according to claim 3 wherein said valve body comprises a second fluid channel similar to and intersecting said first fluid channel at a right angle thereto and to said longitudinal axis.

9. A hydroaccumulator according to claim 1 wherein said connecting sleeve is welded to said pressure tank.

10. A hydroaccumulator according to claim 1 wherein said connecting sleeve is formed on one end of said pressure tank in one piece by one of hot and cold forming.

11. A hydroaccumulator according to claim 1 wherein said connecting sleeve has an outside thread in a section facing said fluid space and is threadly engaged with a mating inside thread on said pressure tank.

12. A hydroaccumulator according to claim 5 wherein said connecting sleeve comprises an inside thread in a section adjoining an end of said piston bore remote from said fluid space; and said support plate comprises an outside thread engaged with said inside thread on said connecting sleeve.

* * * * *